US012536497B2

(12) United States Patent
Stork Genannt Wersborg et al.

(10) Patent No.: US 12,536,497 B2
(45) Date of Patent: Jan. 27, 2026

(54) FOOD PROCESSING SYSTEM (71) Applicant: Interproductec Consulting GmbH & Co. KG, Munich (DE)

(72) Inventors: Ingo Stork Genannt Wersborg, Munich (DE); Frederik Born, Munich (DE); Mathias Sundholm, Munich (DE); Alexander Indig, Munich (DE)

(73) Assignee: Interproductec Consulting GmbH & Co. KG, Munich (DE)

( * ) Notice: Subject to any disclaimer, the term of this patent is extended or adjusted under 35 U.S.C. 154(b) by 203 days.

(21) Appl. No.: 18/255,437

(22) PCT Filed: Dec. 29, 2021

(86) PCT No.: PCT/EP2021/087803
§ 371 (c)(1),
(2) Date: Jun. 1, 2023

(87) PCT Pub. No.: WO2022/144400
PCT Pub. Date: Jul. 7, 2022

(65) Prior Publication Data
US 2024/0029020 A1 Jan. 25, 2024

(30) Foreign Application Priority Data
Dec. 30, 2020 (EP) ..................... 20217777

(51) Int. Cl.
*G06Q 10/087* (2023.01)
*G06Q 50/12* (2012.01)
*G06V 10/25* (2022.01)

(52) U.S. Cl.
CPC .......... *G06Q 10/087* (2013.01); *G06Q 50/12* (2013.01); *G06V 10/25* (2022.01); *G06V 2201/07* (2022.01); *G06V 2201/12* (2022.01)

(58) Field of Classification Search
CPC .. G06Q 10/087; G06Q 50/12; G06Q 30/0202; G06V 10/25; G06V 2201/07;
(Continued)

(56) References Cited

U.S. PATENT DOCUMENTS

2005/0154560 A1* 7/2005 Fitzpatrick ............. G06Q 50/12
702/182
2013/0052616 A1 2/2013 Silverstein
(Continued)

FOREIGN PATENT DOCUMENTS

WO WO-2015031500 A1 * 3/2015 ............. G05B 15/02
WO WO-2015171630 A2 * 11/2015 ............. A47J 27/14
WO WO-2025040687 A1 * 2/2025 ............. G01F 23/22

OTHER PUBLICATIONS

International Search Report and Written Opinion for PCT/EP2021/087803 mailed Apr. 29, 2022 (10 pages).

*Primary Examiner* — Garcia Ade
(74) *Attorney, Agent, or Firm* — Brooks Kushman P.C.

(57) ABSTRACT

Examples relate to a food processing system, which includes a sensor unit for determining holding data of at least one pan or holding container placed in a food holding area. The system can further includes a processing unit for determining a scheduling state based on current holding data and/or a holding data history; and a control unit to control an actuator based on the determined scheduling state.

19 Claims, 2 Drawing Sheets (58) Field of Classification Search
CPC .... G06V 2201/12; G06V 10/82; G06V 20/52; F24C 7/083; G01C 11/04; G01F 22/00; G01F 23/2928; G01F 23/804; G01F 23/28
USPC .......................................................... 705/15
See application file for complete search history.

(56) References Cited

U.S. PATENT DOCUMENTS

| | | |
|---|---|---|
| 2018/0176030 A1 | 6/2018 | Bui Tran |
| 2020/0357083 A1* | 11/2020 | Wallace ................. G06N 20/00 |
| 2020/0367692 A1 | 11/2020 | Stipe |

* cited by examiner

FOOD PROCESSING SYSTEM

CROSS-REFERENCE TO RELATED APPLICATIONS

This application is a national stage of, and claims priority to, Patent Cooperation Treaty Application No. PCT/EP2021/087803, filed on Dec. 29, 2021, which application claims priority to European Patent Application No. EP20217777.0, filed on Dec. 30, 2020, which applications are hereby incorporated herein by reference in their entireties.

BACKGROUND

Restaurants and other retailers that sell fresh food have to manage their inventory levels to match the sales demand throughout the day. At present, solutions are lacking to manage the inventory level autonomously. Technologies are lacking that do not need to be managed by employees, which makes them imprecise and costly to maintain and run.

DETAILED DESCRIPTION

Depth sensors exist to measure the amount of inventory that is available to serve, but these are typically complex, requiring a computer scientist or engineer to determine which sections of the pixel data to measure. Further, these sensors are calibrated in order to provide useful information. This application describes example solutions for automatically or semi-automatically setting the regions of interest and calibrating the sensors to provide information to the user that is relevant to the operations of a restaurant.

When these sensor systems are installed and functioning, sensing the available fresh inventory is only one of the inputs to the management of production scheduling. Additionally, the system could forecast demand, determine how long the existing inventory will last, and order the production of more food when the available inventory will not last longer than the production time. Furthermore, there are constraints related to the equipment used for cooking and to the available labor in the kitchen. The system could order the production of more food earlier than it otherwise would if there are constraints on the available labor or equipment.

In an example, there is provided a system or food production system or food processing system or scheduling system or tracking and scheduling system that enables efficient planning and control of food preparation or food supply.

This is achieved by a system for processing food with the features of claim 1, by a method with the features of claim 13, and by a computer program with the features of claim 15. Advantageous features are given in the dependent claims.

For example, a food processing system may include: a sensor unit for determining holding data or food holding data of at least one pan, container, or food holding container placed in a holding area or food holding area; a processing unit for determining a scheduling state or food scheduling state based on current holding data or food holding data and/or a holding data history or food holding data history; and a control unit to control an actuator based on the determined scheduling state or food scheduling state.

In an example, the system is able to control an actuator, such as in a robotic process, or to inform personnel to prepare food in good time on the basis of data indicating current or previous consumption of food. This makes it possible to keep cooked food available without delay times.

The sensor unit can include at least one of a red-green-blue (RGB) sensor, or other optical sensor, and at least one of a depth sensor, a thermal sensor, a 3D camera, a time of flight sensor, or a stereo camera. The sensors are physically installed in a fixed position and orientation relative to each other. The combination of optical data and depth data allows tracking the depletion rate of food within the pan, container, or food holding container in detail.

In this context, the holding data or food holding data can include information about at least one of a fill level of the at least one pan, container, or food holding container, a holding time or food holding time of the at least one pan, container, or food holding container, a food ingredient associated with the food in the pan, container, or food holding container, information about the availability of the food ingredient, and a food ingredient preparation time. The scheduling state or food scheduling state can include information about the types of food that should be cooked or prepared, the quantity of food that should be cooked or prepared, the destination where the food should be brought, the priority level relative to other scheduled foods, and/or the timing of when the food should be finished cooking or preparing. A cook command is a message communicating information included in the scheduling state or food scheduling state, either to initiate a robotic automation process or to instruct a human operator to begin a cook or preparation process.

In an example, the system can determine the fill level based on 3D pixel data of the holding area or food holding area.

The 3D pixel data can be calculated by the system based on correlating 2D pixel sensor data and depth sensor data, which are determined by the sensor unit.

In an example, the system can then determine regions of interest within the sensor unit's field of view based on the 3D pixel data. It is advantageous to associate measured distances or depths with fill levels of at least two regions of interest different from one another.

In an example, the system can determine a heat state fill level based on enhanced 3D pixel data of the holding area or food holding area by correlating 2D temperature sensor data with 2D pixel sensor data and depth sensor data, which are determined by the sensor unit. With said advanced information also the heat state of the food in the pan, container, or food holding container is taken into consideration.

The scheduling state or food scheduling state can be based on the current fill level and/or current heat state fill level.

Based on the scheduling state or food scheduling state, the control unit can identify a replenish event when a specific fill level of the pan, container, or food holding container is reached. It can start a timer by the replenish event for a predefined ingredient specific holding time. It can initiate cook commands to a grill, stove, fryer, toaster, ice machine, oven, coffee maker or beverage dispenser crew person or initiate an automated robotic process once a predefined time is reached. Moreover, the control unit can initiate replenish commands to exchange the pan, container, or food holding container once a predefined time is reached.

The scheduling state or food scheduling state can be based on a holding data history or food holding data history, wherein, based on the scheduling state or food scheduling state, the control unit can further forecast from previous sales volume or current customer traffic, the forecasted food item quantity or weight to be cooked in a certain time frame. It can augment the forecasting by adding local events, weather, calendar holidays, or other modifications into the calculation of current and future demand. It is able to identify reorder points using the information of anticipated consumption, to initiate cook commands once fill levels drop below a calculated threshold. Furthermore, the control unit can calculate different reorder points for a time of day and for an ingredient individually.

Thus, in an example, the whole food preparation and planning process can be automated saving time and costs.

The system can further include a display unit that is adapted to display the fill levels of the pan, container, or food holding container, available inventory, specific cook commands, action items or requests of a crew person, and/or a destination area for the pan, container, or food holding container. Furthermore, the system can be adapted to prioritize cook commands based on demand and available inventory.

The system can apply vision AI to monitor a grill surface or other cooking device, and to identify what food ingredients are in the process of cooking.

In an Example, Method for Processing Food can Include:
  determining holding data or food holding data of at least one pan, container, or food holding container placed in a holding area or food holding area;
  determining a scheduling state or food scheduling state based on current holding data or food holding data and/or a holding data history or food holding data history; and
  controlling an actuator based on the determined scheduling state or food scheduling state.

Furthermore, Additional Steps can be Performed, which May Include:
  identifying a replenish event when a specific fill level for the pan, container, or food holding container is reached;
  starting a timer by the replenish event for a predefined ingredient specific holding time;
  initiating cook commands to a grill, stove, fryer, toaster, ice machine, oven, coffee maker or beverage dispenser crew person or initiate an automated robotic process once a predefined time is reached; and
  initiating replenish commands to exchange the pan, container, or food holding container once a predefined time is reached.

In an example, a computer program may include that, when executed by a system, cause the system to execute the above described method.

Figure 1:
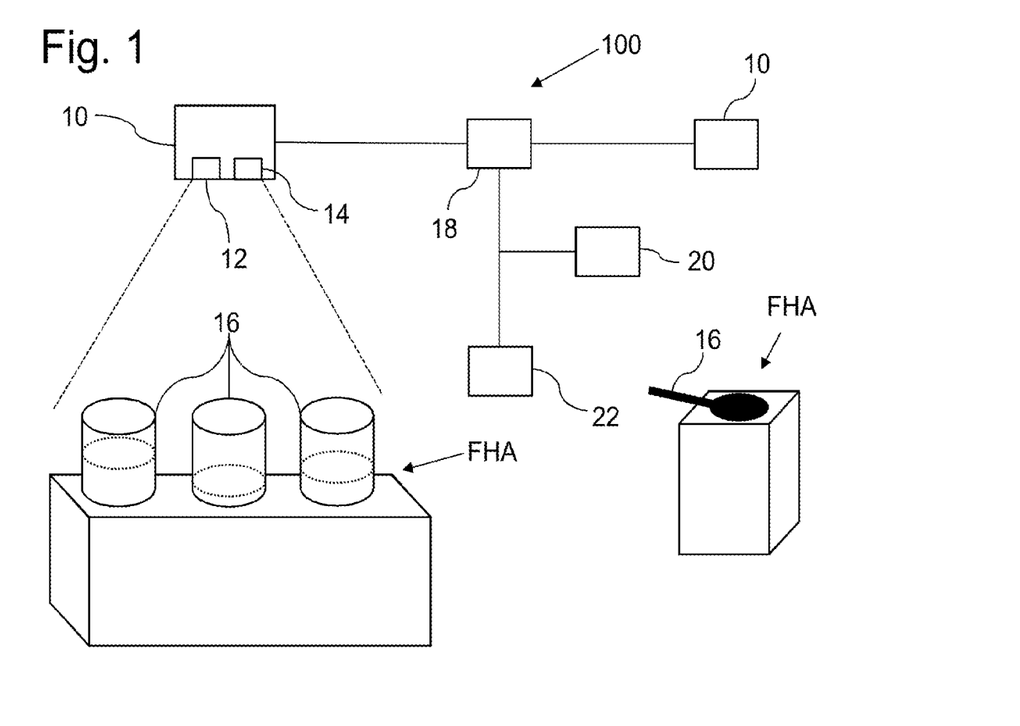
FIG. 1 shows a simplified schematic view of a food processing system.

FIG. 1 shows a simplified schematic view of a food processing system. In particular, the system 100 and a related method align sensors for food production scheduling. The system 100 includes a sensor unit 10, a processing unit 18, and a control unit 20.

The sensor unit 10 determines holding data or food holding data of at least one pan 16 or food holding container 16 placed in a holding area or food holding area FHA. The at least one pan 16 or container 16 is representative for all possible food containers, receptacles, pan mounts and/or food storage or preparation utensils.

The processing unit 18 determines a scheduling state or food scheduling state based on current holding data or food holding data and/or a holding data history or a food holding data history.

Based on the determined scheduling state or food scheduling state, the control unit 20 controls an actuator 22. The actuator 22 can be a crew personnel such as a cook that receives cook commands from the control unit 20 to prepare and cook a specific food ingredient. In addition, the control unit 20 can also initiate an automated robotic process to prepare and cook food.

The processing unit 18 and the control unit 20 each may include a computer, a virtual machine or container running on a computer, or a software suite running on a computer. The processing unit 18 and the control unit 20 each may include memory for holding data to process, processing power to make computations and execute program instructions stored in the memory.

The sensor unit 10, the processing unit 18, the control unit 20, and the user interface or display unit may be connected via a network for moving data between them. This network may include connections such as physical ethernet, wi-fi or other LAN connections, WAN, VPN, cellular, Bluetooth, or other connections for transferring data between system components and to users both onsite and remote to the system.

In the following the sensor unit 10 and the processing unit 18 are described in detail.

Sensor Unit 10 and Processing Unit 18

Identifying different pans 16 or pan mounts and dimensions in an image and using image coordinates to identify a normalized image or depth map that corrects different observation points in at least two different measurement setups.

Correlating an RGB pixel coordinates of sensor 12 with pixel coordinates of depth sensor 14 to determine the pixel coordinates of an item in the depth sensor's field of view. Using computer vision or other types of processing to locate items on the RGB stream's pixel coordinates in real time, and to draw depth measurements from a pixel area defined by the processing of the RGB stream.

In an example, the sensor unit 10 includes an RGB sensor 12 or other optical sensor 12 and an additional sensor 14, which may be any one or a combination of digital sensors including depth sensors, thermal sensors, 3D cameras, time of flight sensors, or stereo cameras, which may depend on the desired sensing result or results. The RGB sensor 12 or other optical sensor 12 may provide a stream of data or images in the form of pixel data, which can be used to find objects or target regions of interest in the field of view or pixel coordinates of the sensor. The RGB 12 or other optical sensor 12 may be physically installed in a fixed position and orientation relative to the additional sensor 14.

In general, the processing unit 18 may receive as an input the stream of data or images from the RGB 12 or other optical sensor 12, and may perform processing by method of computer vision, algorithmic image processing, corner detection, blob detection, or edge detection or other pixel data processing method, and may send as an output a stream of images annotated with the pixel coordinates and/or pixel size of various objects or regions of interest in the field of view of the sensor.

The additional sensor 14 may receive as an input the annotated stream of images from the processing unit 18, to determine where in its field of view lie certain specified objects or regions of interest. The additional sensor 14 may use the annotations to determine a direction, a pixel, or a group of pixels for measurement. The additional sensor 14 may measure the depth, temperature, or other parameters of the direction, pixel, or group of pixels specified by the processing unit.

The preferred additional sensor 14 is a sensor 14 that can measure a distance for at least one point, including TOF, LIDAR, 3D or stereo camera setup, including illumination unit including visible light wavelength as well as infrared wavelength, including advantageously a 3D camera setup that also includes a RGB image of the same area it monitors with depth sensing.

It is advantageous to calibrate multiple observed pans 16 with multiple regions of interest in one image or point matrix or vector, and to associate the measured distance with fill levels of at least two different regions of interest different from one another. Individual configuration files enable the system 100 to set different parameters for fill level at different regions of interest.

To calibrate the sensor 14, a technician places pans 16 or receptacles with different volumetric amounts of product, such as 100%, 50%, 30%, 15%, 5%, and empty, into different pan positions. The technician confirms the fill level of a pan position on a user interface. A configuration file is created for pan positions, including the depth reading at a pan position. When the system 100 is activated for readings, the system 100 reads the depth reading at a pan position, and checks it against the calibration values in the configuration file corresponding to the selected pan position. Once several systems 100 in the same restaurant chain have been calibrated, the system 100 can be calibrated only for empty pans 16, skipping the full and partially full calibration. The system 100 can then learn over time the typical fill level seen in operations.

Volumetric assessment using depth sensing enables the system 100 to measure the available inventory by measuring the fill levels of a previously calibrated pan 16. The process includes methods to lower impact of occlusions, such as taking the longest distance from sensor 14 to food item or using object recognition to identify utensils such as spoons on a corresponding image to carve out a region of interest in a point matrix representing a depth measurement, and/or calculating the average depth value of pixels identified as not being outliers. Volumetric sensing is converted to a % fill level for pan 16. Correlating the volumetric assessment with food item ingredient data and preparation specific food density, such as for instance a sliced meat to calculate the available food item weight according to reference weights and the current volumetric fill level.

The measured fill levels of the pans 16 or containers or food holding containers 16, which are indicated by the dotted circles in FIG. 1, are included in the holding data or food holding data. Said data further includes information about a food holding time of the pan 16 or container 16, a food ingredient associated with the food in the pan 16 or container 16, information about the availability of the food ingredient, and a food ingredient preparation time.

Figure 2:
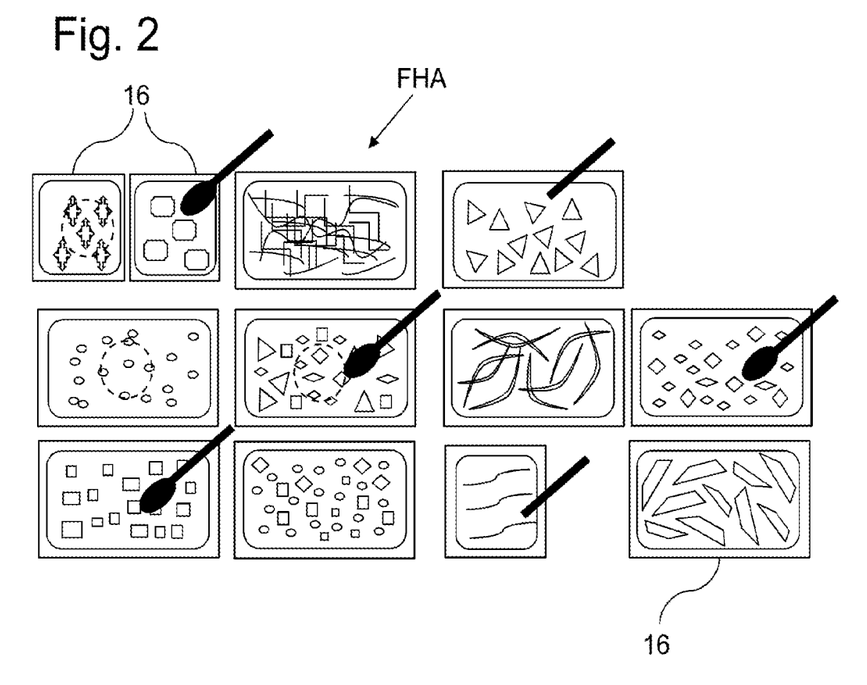
FIG. 2 shows a simplified schematic view of a holding area or food holding area including pans or food holding containers.

In this context, FIG. 2 shows a simplified schematic view of the holding area or food holding area (FHA) including pans 16 or containers 16. The regions of interest for three pans 16 or containers 16 in this example are indicated by a dashed rectangle. As described above, the occlusions created by the spoons are filtered out of the processed data.

It is beneficial for the system 100 to determine the fill level based on 3D pixel data of the holding area or food holding area FHA. Said 3D pixel data is calculated based on correlating 2D pixel sensor data and depth sensor data, which are determined by the sensor unit 10.

The system 100 then determines regions of interest within the field of view of sensor unit 10 based on the 3D pixel data. In the example shown in FIG. 1, the field of view is indicated by the dashed lines. It is advantageous to associate measured distances or depths of the depth sensor data with fill levels of at least two regions of interest different from one another.

In addition, a heat state fill level is determined based on enhanced 3D pixel data of the holding area or food holding area FHA by correlating 2D temperature sensor data with 2D pixel sensor data and depth sensor data, which are determined by the sensor unit 10.

The scheduling state or food scheduling state can be based on the current fill level and/or current heat state fill level. Depending on said state specific food cooking commands can be issued by the control unit 20.

Based on the depth reading, pixel coordinates, and pixel size of a pan, a scoop, or a specific serving, the system 100 can calculate the weight or volume of food that was removed from the pan 16 or warm holding container 16. By calculating the size of a serving of food, the system 100 can present information to management about the rate of depletion for an ingredient. The system 100 can identify automatically whether a single or double serving of an ingredient was provided.

Figure 3:
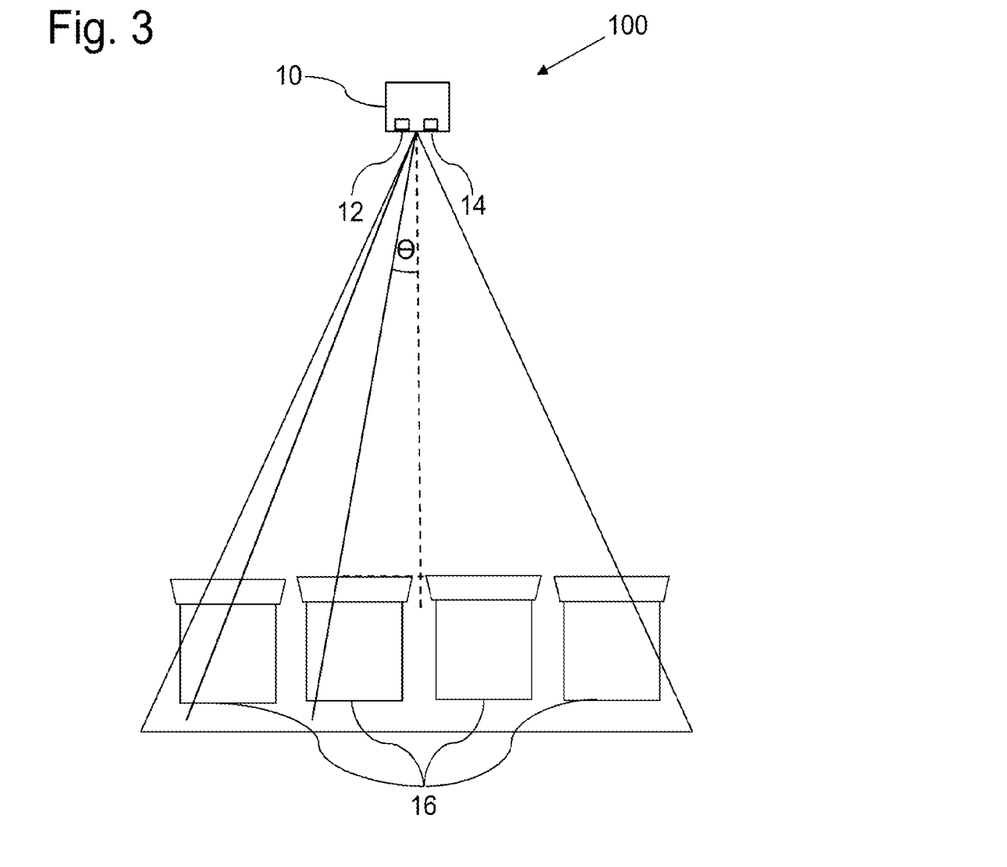
FIG. 3 shows an example for adjusting depth readings.

Depth readings may be adjusted based on the pixel coordinates of the reading. The distance from the sensor 14 to the measured position may be multiplied by the cosine of the effective angle $\theta$ to determine the closest distance from the measured point to the plane of the sensor 14. This calculation may be done on a per-pixel basis or for discrete identified regions of interest to reduce the required processing power or CPU load for calculation.

FIG. 3 shows an example for adjusting said depth readings. The depth reading for pan 16 or food holding container 16 can thus be corrected.

It is advantageous to use this method to have a unified observation over multiple locations for a grill or grill warm holding area FHA. The system 100 may track items with object detection including differentiation by caliber (burger patty thickness) and associating timers for an observed grill item. The system 100 may check if timers exceed predefined holding times, such as 5 minutes for a burger patty. The system 100 may initiate an event on a screen or a notification to a crew person once a predefined time is exceeded. The system 100 may calculate a target inventory of food items and initiate an event on a screen or a notification to a crew person once a predefined count or inventory is exceeded or fall below a predefined threshold. The system 100 may dynamically add or reduce the threshold when a customer traffic event occurs and is sensed. A customer traffic event may be a daypart-dependent predefined number to be added to the target inventory in the event a car is detected in a drive-through or customer detected walking into the store. For example, a car pulling into a drive-through at 1 pm may represent 1.6 burger patties, 13 ounces of fries, and 3.7 chicken nuggets, which may be added to the demand forecast and threshold.

The system 100 may use action detection to identify start and end time for a certain cooking or preparation action in a kitchen from a video stream. It is advantageous to use measured time or an average over multiple observations of the same action to calculate the current time to complete certain tasks in a kitchen such as breading chicken, distributing dough over a plate, assembling a burger or loading or unloading of a kitchen device such as a fryer or putting items into a bag or tray. It may be advantageous to use the calculated action times to forecast current or future throughput or time to prepare a certain food quantity. Associating the measured timings with expected or measured customer traffic to suggest action items to kitchen crew or adapt staffing plans or order ingredients.

Production Planning

For fast food restaurants, retail bakeries, fast casual restaurants, other foodservice, or other fresh food retail locations, effective production planning results in food being available and fresh at all hours of the day. To achieve this, the system 100 could use a sales demand prediction to determine the "reach" of an ingredient, defined as the duration that the current inventory will last. An ingredient has a measurable call time, defined as the duration of time that it takes to prepare and bring fresh ingredients to their destination, once the system has requested that staff prepare them. When the reach of a given ingredient is less than the call time, this is an indication that the production process is behind schedule.

Forecasting from previous sales volume or current customer traffic such as walk-in, inbound digital orders or cars before order point in drive-through, the forecasted food item quantity or weight to be cooked in a certain time frame, for instance the next 15 minutes. Forecasting accuracy can be augmented by adding local events, weather, calendar holidays, or other modifications into the calculation of current and future demand. Identifying reorder points using the information of anticipated consumption, to initiate cook commands once fill levels drop below a calculated threshold. In particular of advantage to calculate different reorder points for a time of day and for an ingredient individually. Initiating cook commands to grill, stove, fryer, toaster, ice machine, oven, coffee or beverage maker crew person or automated robotic process once fill levels are below the calculated threshold. Initiating replenish commands to exchange a pan, basket, tray, or other warm holding receptacle, once the receptacle reaches a certain pan fill level.

The scheduling state or food scheduling state is based on a holding data history or a food holding data history. Taking account of said state, and in view of the above, the control unit 20 can forecast from previous sales volume or current customer traffic the forecasted food item quantity or weight to be cooked in a certain time frame. Moreover, it can augment the forecasting by adding local events, weather, calendar holidays, or other modifications into the calculation of current and future demand. In addition, reorder points can be identified using the information of anticipated consumption, to initiate cook commands once fill levels drop below a calculated threshold. The control unit 20 can also calculate different reorder points for a time of day and for an ingredient individually.

Identifying replenish events by surpassing a fill level for a pan fill level measurement over a certain time frame. Starting a timer by the replenish event for a predefined ingredient specific holding time. Initiating cook commands to grill, stove, fryer, toaster, ice machine, oven, coffee maker or beverage dispenser crew person or automated robotic process once a predefined time is reached. Initiating replenish commands to exchange pan once a predefined time is reached.

Thus, based on the scheduling state or food scheduling state, the control unit 20 can identify a replenish event when a specific fill level of the pan 16 or food holding container 16 is reached. It can start a timer by the replenish event for a predefined ingredient specific holding time. In addition, it can initiate cook commands to a grill, stove, fryer, toaster, ice machine, oven, coffee maker or beverage dispenser crew person or initiate an automated robotic process once a predefined time is reached. The control unit 20 can also initiate replenish commands to exchange the pan 16 or food holding container 16 once a predefined time is reached.

The system 100 may adjust its requests or cook commands by adding additional time allowances for equipment constraints. For example, a grill surface or fryer vat may be used for multiple ingredients A and B. If ingredient A has a reach of 30 minutes and a call time of 20 minutes, and ingredient B has a reach of 20 minutes and a call time of 10 minutes, the system 100 could order ingredient B now, since the restaurant will could use both ingredients within the total call time of the two ingredients. Similarly, a cook command requires a certain measurable labor time to execute the cooking, preparation, and serving of the food. By tracking the available labor and the required labor for a cook command, the system determines when labor constraints would cause delays and can send cook commands earlier depending on the severity in minutes of the anticipated labor shortage.

Operational rules and best practices can be input into the system 100 as assumptions for the calculations. For example, sometimes a new batch of food will replace an old batch and the old batch can be added on top of the new batch; whereas sometimes a new batch will replace an old batch and the old batch will be thrown away. Certain ingredients can be cooked or baked together in the same oven chamber or other cooking device, while certain combinations of ingredients cannot be cooked together for food safety or other reasons. The system 100 plans for this by forecasting sales into the future, planning its next several steps, and combining the requirements for the next several steps.

Certain equipment can cook a linear amount of food, such as a grill surface that holds a specified amount of chicken. However, certain equipment such as fryers can cook larger or smaller batches using the same size oil vat. For example, the system 100 can request larger batches rather than sending multiple smaller batches, since this requires less labor and less space on the fryer or other equipment. Conversely, if the larger batch will cause overproduction and stale food, the system can request more smaller batches. Over time through supervised learning, unsupervised learning, or reinforcement learning, the system 100 makes an ever-improving value-based decision as to which variables are most important to the operation of the kitchen: whether labor or equipment space is the limiting factor at a given time, or whether violating hold times outweigh the equipment or labor concerns.

To include equipment constraints and calculate the effective call times, the system 100 adds together the call times of an ingredient that shares a piece of equipment. The system 100 compares this effective call time against an effective reach, calculated by adding together the reach of the ingredients to be cooked. The system 100 decides on a planned order of ingredient cooking, so that the effective call time is less than the effective reach at an intermediate step.

The call times for ingredients are not perfectly static. Average call times may be estimated, but the true call time depends on the number of outstanding tasks for crew and the amount of staffing available to carry out these tasks. Typically all production planning will include additional time for human or robot execution of the cooking and related processes, as well as a factor of safety in case unforeseen events slow down the production process.

Fresh food has a finite holding time. One result of this fact is that the system 100 could request new production not only when the available inventory is running low, but also periodically to ensure the available food is within its acceptable hold times. The system 100 plans for these batches to be cooked by setting timers from the moment when food is sensed to have been replenished. The system 100 keeps a database of the parameters of ingredients, including maximum hold times. By subtracting the actual time the food has been on the line from the maximum hold time, the system 100 can determine the time remaining before an ingredient could be replenished. Further subtracting from this the call time for that ingredient, the system 100 can calculate the ideal moment when new food production could be requested from the crew.

The system 100 logs its own requests, the logic for a cook command or request, and when the command was addressed in the kitchen. Measuring the time a cook command was displayed to a crew member and the time the crew member acknowledges or bumps it off the screen or can be seen by action detection that the cooking command is being started to determine a response time. Calculating an average response time over multiple observations. Calculating reorder points over multiple observations.

Using a database to count pans observed entering or exiting certain regions of interests or shelves within a store.

The calculated decisions of system 100 are executed and lead to a result that either is beneficial or detrimental to the restaurant's operations. Beneficial outcomes include having products available, discarding minimal food waste, and serving food with higher freshness than is typically observed. Detrimental outcomes include ingredients stocking out, or having a large amount of food reach its maximum hold time. The system 100 captures these signals and improves over time, using an agent such as a reinforcement learning agent. The actions and decisions leading to beneficial outcomes are rewarded, whereas the actions and decisions leading to detrimental outcomes are punished, so they happen less often in similar situations in the future.

In addition to the above, a computer implemented method for processing food includes the following steps:
  determining holding data or food holding data of at least one pan (16) or food holding container (16) placed in a holding area or food holding area;
  determining a scheduling state or food scheduling state based on current holding data or food holding data and/or a holding data history or a food holding data history; and
  controlling an actuator based on the determined scheduling state or food scheduling state.
  Calculating an average fill level based on multiple measurements of the same pan.
  Using object recognition to identify a pan or container, a combination of food type and pan or container, or a certain combination of pans or containers and food types in a certain layout or a serving area.
  Comparison of two images to derive a depth information or a matrix or array or vector representing the same.

The stereo camera sensing is in particular useful if an IR projector or an RGB LED module is added, black framing or rubber is used for isolation, and if mounted on a ceiling mount USB or Ethernet plugs or a multi axis moving plate are added to the mounting. It is further advantageous to add optical filters such as IR filter, IR passthrough, longpass filters, shortpass filters, bandpass filters, polarizing filters, or visible wavelength passthrough coatings. These can remove noise in depth readings that result from direct light reflections or other sources of data noise.

It is further advantageous if pre-processing of any image data includes the calculation of HDR images or color normalization.

Furthermore, the Following Steps can be Performed:
  identifying a replenish event when a specific fill level of the pan 16 or food holding container 16 is reached;
  starting a timer by the replenish event for a predefined ingredient specific holding time;
  initiating cook commands to a grill, stove, fryer, toaster, ice machine, oven, coffee maker or beverage dispenser crew person or initiate an automated robotic process once a predefined time is reached; and
  initiating replenish commands to exchange the pan 16 or container 16 once a predefined time is reached.
  initiating a message via display or voice command or buzzer or acoustic signal to the crew indicating a component or food item or item of a pan that has been added to an order although the POS data of that order does not include the component or food item or item of that pan A computer program including instructions that, when executed by the system 100 as described above, causes the system 100 to execute the method steps indicated above.

Secondary Storage Monitoring

Many ingredients take time to prepare for service, but it is not practical to do preparation during the peak hours of meal times. To solve this problem, many restaurants prepare food ahead of time and use hot or cold storage units where they can keep prepared pans, trays, or other containers of prepared food.

The system 100 could manage these storage units in order to instruct crew members when to prepare more food. To track this inventory, the system senses the amount of food that is prepared cold or hot in a storage unit, based on an RFID, QR code, OCR, barcode or other visual or code tag.

System 100 calculates the "reach" in time of the available inventory in secondary storage, and signals kitchen crew or management to prepare, cook, or order more of the item based on the predicted sales volume for that ingredient for the upcoming minutes or hours, or for the rest of the day or week.

Based on the sales demand forecasts, the system 100 can inform crew at the beginning of the day, as well as during off-peak service hours, how much food to prepare and keep in warm or cold storage. These inventory levels are monitored throughout the day, and the quantity for preparation is recalculated based on dynamic sales forecasts and dynamic sensing of the stored inventory.

The amount of prepared food in secondary storage is often limited by labor. The system 100 can manage the labor required to prepare the forecasted amount of the ingredients, by comparing the average and expected time for a task with the amount of labor available and allocating labor hours to the most pressing tasks.

Touch (or No-Touch) User Interface

The system 100 further includes a display unit that is adapted to display the fill levels of the pan 16 or food holding container 16.

User interface displays fill levels of available inventory and/or stored secondary inventory. User interface shows specific cook commands, action items, or requests of the crew.

A food producer, i.e., grill operator, produces food for multiple service channels to be stocked with available inventory. UI specifies for each cook command, not only the type of product and the batch size but also where the cooked product should be sent. For example, there may be hot holding at a customer-facing sales channel and at a drive through sales channel. The UI for a production crew member saves time by displaying the destination sales channel(s) for a batch.

The UI may display the cook command before it displays the destination service area. If the destination service area is designated once the food is already cooking, this gives the AI-driven system more time to see how events and inventory levels develop, and to make an appropriate decision.

Batching: UI specifies how much of the product to cook. For a batch, the UI displays a timer on the UI for when to flip or remove items from a cook process such as a grill surface.

The system 100 further applies vision AI.

Vision AI monitors the grill surface or other cooking device, and identifies what items are in the process of cooking. The system 100 automatically changes the state of these items on the UI when cooking, and removes them when cooking is complete. Vision AI also may monitor the crew members and their actions using computer vision, pattern recognition, or action detection algorithms. When the crew member completes the task to be completed, the recognized action is automatically removed from the "to-do" list of the UI.

Automatic Cashier

Using vision AI, the system tracks a burrito, bowl, or other menu item as it is being prepared. In other words, using vision AI, the system tracks a menu item as it is being prepared. As ingredients are added to the item, the system identifies an ingredient and "rings up" the customer for an item containing the ingredients that were served. This automatically detected checkout can be confirmed or modified by a staff member, or can be automatically accepted.

In many restaurants, the ingredients that are used affect the price that the customer should pay for the item. In these cases, the system 100 uses vision detection methods to identify and track both the ingredients, and to which menu item they were added. A menu item is visually identified, and the system tracks a list of ingredients that were added to it, so the software can assign a price to an item based on its ingredients.

Infrastructure

For robustness of function, it is typically advantageous to have the detection, UI, and all business or operational calculations occur in devices on site at the edge. Computer vision, machine learning, or other AI models can be updated remotely via the cloud, but deployed directly on devices at the restaurant level. Other software updates can also be engineered remotely and deployed to numerous restaurants during off-hours such as late at night.

The cloud may also be used for reporting. Specified KPIs can be added to a user-customizable dashboard that includes annotated or raw live streams, and relevant information for management regarding staff performance, equipment performance, ingredient availability, food waste, sales forecasts for an ingredient, average freshness or other freshness KPIs for an ingredient, and other relevant data that can be extracted from the AI inference and software.

The invention claimed is:

1. A system, comprising:
   a computer including a processor coupled to a memory, the memory storing instructions executable by the processor to:
   receive output data from a sensor to determine current holding data of a container in a food holding area, wherein the current holding data describes a fill level of the container, the fill level of the container being determined via an effective angle of a closest distance between a measured point and the plane of a depth sensor;
   determine a scheduling state based on the current holding data or a history of the current holding data, wherein the scheduling state describes a quantity of the food to be prepared, and a destination of the food, a priority level, or a completion time of the food; and
   a control unit to generate a signal to actuate a robotic process based on the determined scheduling state and the fill level of the container.

2. The system of claim 1, wherein the current holding data further includes an available inventory of an ingredient of the food.

3. The system of claim 1, wherein the instructions further include instructions to:
   determine the fill level based on a three-dimensional image of the food holding area based on output data from the sensor.

4. The system of claim 1, wherein the instructions are additionally to compute a three-dimensional image of the food holding area based on correlating output data from a camera sensor and output data from the depth sensor.

5. The system of claim 1, wherein the sensor includes a camera sensor, and wherein the instructions are additionally to:
   determine regions of interest within a field-of-view of the camera sensor based on a three-dimensional image of the food holding area.

6. The system of claim 1, wherein the sensor includes the depth sensor or a distance sensor, and wherein the instructions are additionally to measure the fill level of the container in a first region of interest and a fill level of a second container in a second region of interest, wherein the first and second regions of interest are different regions.

7. The system of claim 1, wherein the sensor includes a camera sensor, and wherein instructions are additionally to:
   determine a heat state based on image data from the camera sensor of the food holding area correlated with two-dimensional temperature sensor data of the food holding area.

8. The system of claim 1, wherein the sensor includes a camera sensor, and wherein the instructions are additionally to:
   determine a heat state based on image data from the camera sensor of the food holding area and based on output data from the depth sensor.

9. The system of claim 1, wherein the scheduling state is based on a current fill level of a current heat state of the food.

10. The system of claim 1, wherein the instructions are additionally to:
    actuate a robotic process replenish event responsive to the container reaching a predefined fill level; and
    initiate a timer for the replenish event to occur for a predefined holding time for an ingredient.

11. The system of claim 1, wherein the instructions are additionally to:
    actuate a cook command to a grill, stove, fryer, toaster, ice machine, oven, coffee maker, or beverage dispenser responsive to receipt of output data from a timer; and
    actuate a robotic process replenish command to exchange the container responsive to receipt of output data from the timer.

12. The system of claim 1, wherein the scheduling state is determined based on the history of the current holding data, and wherein, based on the scheduling state, the instructions are additionally to:

forecast, from previous sales volume or current customer traffic, the quantity of the food to be cooked in a time frame; and augment the forecasted previous sales volume responsive to determination of an event determined from output data of a computer-implemented calendar.

13. The system of claim 1, wherein the scheduling state is determined based on the history of the current holding data, wherein, based on the scheduling state, the instructions are additionally to:

identify a first reorder point, based on a predicted consumption, to initiate a cook command responsive to the fill level of the container dropping below a predefined threshold; and compute a second reorder point for a time of day and for an ingredient based on the predicted consumption.

14. The system of claim 1, wherein the system further includes a display unit to display the fill level of the container, available inventory, specific cook commands, or a destination area for the container.

15. The system of claim 1, wherein the instructions are further to:

implement a computer vision application to monitor a cooking device.

16. The system of claim 1, wherein the instructions are further to:

implement a computer vision application to identify a food ingredient during a cooking process.

17. A method comprising:

determining a food holding time of a container placed in a food holding area;

determining a scheduling state based on the food holding time or a history of the food holding time, wherein the scheduling state describes a quantity of the food to be prepared; and controlling generation of a signal to actuate a robotic process based on the determined scheduling state and a current fill level of the container, the fill level of the container being determined via an effective angle of a closest distance between a measured point and the plane of a depth sensor.

18. The method of claim 17, further comprising:

identifying a replenish event responsive to the container reaching a predefined fill level;

initiating a timer responsive to the replenish event for a predefined holding time of an ingredient; and transmitting a replenish command to exchange the container responsive to output data from the timer.

19. The method of claim 17, further comprising:

identifying a first reorder point, based on a predicted consumption, to initiate a cook command responsive to a fill level of the container dropping below a predefined threshold; and computing a second reorder point for a time of day and for an ingredient based on the predicted consumption.

* * * * *